(12) United States Patent
Ohtomo et al.

(10) Patent No.: US 9,158,305 B2
(45) Date of Patent: Oct. 13, 2015

(54) REMOTE CONTROL SYSTEM

(75) Inventors: Fumio Ohtomo, Asaka (JP); Kazuki Osaragi, Tokyo-to (JP); Tetsuji Anai, Tokyo-to (JP)

(73) Assignee: Kabushiki Kaisha TOPCON, Tokyo-to (JP)

( * ) Notice: Subject to any disclaimer, the term of this patent is extended or adjusted under 35 U.S.C. 154(b) by 461 days.

(21) Appl. No.: 13/565,153

(22) Filed: Aug. 2, 2012

(65) Prior Publication Data

US 2013/0038692 A1 Feb. 14, 2013

(30) Foreign Application Priority Data

Aug. 9, 2011 (JP) .................................. 2011-173557

(51) Int. Cl.
*H04N 13/02* (2006.01)
*G05D 1/00* (2006.01)

(52) U.S. Cl.
CPC ............ *G05D 1/0038* (2013.01); *G05D 1/0016* (2013.01)

(58) Field of Classification Search
CPC ............ H04N 13/00; H04N 21/42202; H04N 21/42209; H04N 21/4222; H04N 21/44218; H04N 21/44222; H04N 21/8226; H04N 2201/3254; H04N 7/183; H04N 13/0203; H04N 13/04; H04N 13/0253; H04N 13/0207; H04N 13/0275; H04N 13/0081
USPC ................................................ 348/46, 47, 51
IPC ........................................................ H04N 13/02
See application file for complete search history.

(56) References Cited

U.S. PATENT DOCUMENTS

| 8,860,787 B1* | 10/2014 | Neven .............................. 348/46 |
| 2001/0048763 A1 | 12/2001 | Takatsuka et al. |
| 2004/0174453 A1 | 9/2004 | Okada et al. |
| 2012/0239196 A1* | 9/2012 | Olivier et al. .................. 700/259 |

FOREIGN PATENT DOCUMENTS

| JP | 3-56923 A | 3/1991 |
| JP | 08-280003 | * 10/1996 ............. H04N 13/00 |
| JP | 8-280003 A | 10/1996 |
| JP | 9-37137 A | 2/1997 |
| JP | 2001-187279 A | 7/2001 |

(Continued)

OTHER PUBLICATIONS

Japanese communication mailed Apr. 21, 2015 in corresponding Japanese patent application No. 2011-173557.

*Primary Examiner* — Trang U Tran
(74) *Attorney, Agent, or Firm* — Nields, Lemack & Frame, LLC (57) ABSTRACT

A remote control system comprises a mobile object, a remote controller for remotely controlling the mobile object, and a storage unit where background images to simulate a driving room or an operation room of the mobile object are stored. The mobile object has a stereo camera, a camera control unit for controlling image pickup direction of the stereo camera, and a first communication unit for communicating information including at least images photographed by the stereo camera. The remote controller has a second communication unit for communicating to and from the first communication unit, a control unit for controlling the mobile object, and a display unit for synthesizing at least a part of the images photographed by the stereo camera and the background images and for displaying the images so that a stereoscopic view can be displayed.

11 Claims, 5 Drawing Sheets

(56) References Cited

FOREIGN PATENT DOCUMENTS

| JP | 2001-344597 A | 12/2001 |
| JP | 2002-32789 A | 1/2002 |
| JP | 2003-127994 A | 5/2003 |
| JP | 2004-271557 A | 9/2004 |

* cited by examiner

REMOTE CONTROL SYSTEM

BACKGROUND OF THE INVENTION

The present invention relates to a remote control system when a mobile object is remotely controlled by manual operation.

In a case where a mobile object is remotely controlled, or in a case where a mobile object is remotely controlled in a range where the object cannot be visually confirmed, or in a case where precise operation is required even in a range where the mobile object can be visually confirmed, it is necessary to have information such as conditions of the mobile object or advancing direction of the mobile object.

The Japanese Patent Application Publication JP-A-H8-280003 discloses the fact that a three-dimensional camera is mounted on the mobile object, and an image obtained by the three-dimensional camera is transmitted to an operator side, and the operator has a head-mounted display on his head and remotely controls the mobile object while watching an image, which is transmitted to the head-mounted display.

According to the Japanese Patent Application Publication JP-A-H8-280003, the three-dimensional camera is fixed on the mobile object, and sighting direction is fixed in forward direction on front side of the mobile object. As a result, the operator can only passively watch an image transmitted from the three-dimensional camera, and field of view is also limited by the field angle of the three-dimensional camera. Accordingly, it is not possible to obtain images of the object in forward upper direction or in forward lower direction or in forward leftward direction or forward rightward direction or in lateral direction. Therefore, sufficient information on operation cannot be obtained at a narrow and confined place or at a place with many obstacles.

Further, in a case where the mobile object is a flying object such as a small type helicopter or the like, its advancing direction can be changed in wider range, i.e. in leftward or rightward direction or in upper or lower direction, and degree of freedom for the change of direction is higher. As a result, types of information needed for remote control operation are not limited to the images with limitation in field angle of the three-dimensional camera, and images in wider range is needed. Also, it is preferable that the operator can obtain the images in such direction as the operator wants to change to suit the will of the operator.

Further, the Japanese Patent Application Publication JP-A-H3-56923 discloses a remote control system, which can change the direction of photographing by detecting a movement of the head of an operator.

SUMMARY OF THE INVENTION

It is an object of the present invention to provide a remote control system, by which an operator can obtain an image by a three-dimensional camera installed on a mobile object and can have a feeling as real as if it actually happens and with higher remote operation efficiency by modeling after the mobile object as seen from the operator.

To attain the above object, a remote control system according to the present invention comprises a mobile object, a remote controller for remotely controlling the mobile object, and a storage unit where background images to simulate a driving room or an operation room of the mobile object are stored, and in the remote control system, the mobile object has a stereo camera, a camera control unit for controlling image pickup direction of the stereo camera, and a first communication unit for performing communication of information including at least images photographed by the stereo camera, and the remote controller has a second communication unit for performing communication to and from the first communication unit, a control unit for controlling the mobile object, and a display unit for synthesizing at least a part of the images photographed by the stereo camera and the background images and for displaying the images so that a stereoscopic view can be displayed.

Further, the remote control system according to the present invention comprises a posture detecting unit for detecting direction of an operator's line of sight, and the camera control unit can change image pickup direction of the stereo camera based on result of detection by the posture detecting unit.

Further, in the remote control system according to the present invention, the mobile object has camera driving units for changing image pickup direction of the stereo camera with respect to the mobile object, and image pickup direction can be changed by controlling the camera driving unit based on result of detection by the posture detecting unit.

Further, in the remote control system according to the present invention, the mobile object has a moving means for moving the mobile object, and the moving means can change image pickup direction of the stereo camera by controlling posture of the mobile object based on result of detection by the posture detecting unit.

Further, in the remote control system according to the present invention, the display unit is a head-mounted display, and the posture detecting unit is mounted on the head-mounted display.

Further, in the remote control system according to the present invention, the background images stored in the storage unit include position information relating to depth of a scene as visually recognized at the time of stereoscopic identification by the operator, and images can be visually recognized with relative depth with respect to the images photographed by the stereo camera when the background images are displayed on the display unit.

Further, in the remote control system according to the present invention, the mobile object has a mobile object position detecting unit for acquiring position information of the mobile object, information relating to the remote control operation is stored in the storage unit, and information relating to the remote control operation is displayed on the display unit based on an output of the mobile object position detecting unit.

Further, the remote control system according to the present invention comprises a calculation unit for carrying out stereoscopic measurement on at least a part of an object to be photographed based on an image photographed by the stereo camera, and information corresponding to relative positional relation between the object to be measured as measured by the calculation unit and the stereo camera or the mobile object is displayed on the display unit so that images of the information can be stereoscopically recognized.

Furthermore, in the remote control system according to the present invention, the camera control unit corrects image pickup direction of the stereo camera to match the tilting of a helicopter body when the mobile object is tilted.

According to the present invention, the remote control system comprises a mobile object, a remote controller for remotely controlling the mobile object, and a storage unit where background images to simulate a driving room or an operation room of the mobile object are stored, and in the remote control system, the mobile object has a stereo camera, a camera control unit for controlling image pickup direction of the stereo camera, and a first communication unit for performing communication of information including at least images photographed by the stereo camera, and the remote controller has a second communication unit for performing communication to and from the first communication unit, a control unit for controlling the mobile object, and a display unit for synthesizing at least a part of the images photographed by the stereo camera and the background images and for displaying the images so that a stereoscopic view can be displayed. As a result, it is possible to perform remote control operation with such feeling as real as if the operator were on board the mobile object.

Further, according to the present invention, the remote control system comprises a posture detecting unit for detecting direction of an operator's line of sight, and the camera control unit can change image pickup direction of the stereo camera based on result of detection by the posture detecting unit. As a result, it is possible for the operator to actually see a view from the mobile object and to perform remote control operation with such feeling as if the operator could change the line of sight on the mobile object.

Further, according to the present invention, in the remote control system, the mobile object has camera driving units for changing image pickup direction of the stereo camera with respect to the mobile object, and image pickup direction can be changed by controlling the camera driving unit based on result of detection by the posture detecting unit. As a result, it is possible for the operator to actually see a view from the mobile object and to perform remote control operation with such feeling as if the operator could change the line of sight on the mobile object.

Further, according to the present invention, in the remote control system, the mobile object has a moving means for moving the mobile object, and the moving means can change image pickup direction of the stereo camera by controlling posture of the mobile object based on result of detection by the posture detecting unit. As a result, it is possible for the operator to actually see a view from the mobile object and to perform remote control operation with such feeling as if the operator could change the line of sight on the mobile object.

Further, according to the present invention, in the remote control system, the display unit is a head-mounted display, and the posture detecting unit is mounted on the head-mounted display. As a result, higher feeling as real can be obtained, and the remote control operation can be carried out with intuitive feeling.

Further, according to the present invention, in the remote control system, the background images stored in the storage unit include position information relating to depth of a scene as visually recognized at the time of stereoscopic identification by the operator, and images can be visually recognized with relative depth with respect to the images photographed by the stereo camera when the background images are displayed on the display unit. As a result, the operator can have a real feeling as if the operator operated the mobile object from a driving room or from an operation room.

Further, according to the present invention, in the remote control system, the mobile object has a mobile object position detecting unit for acquiring position information of the mobile object, information relating to the remote control operation is stored in the storage unit (38), and information relating to the remote control operation is displayed on the display unit based on an output of the mobile object position detecting unit. As a result, information relating to the remote control operation can be obtained in the course of the remote control operation of the mobile object, and reliable remote control operation can be performed without interrupting the operating procedure.

Further, according to the present invention, in the remote control system comprises a calculation unit for carrying out stereoscopic measurement on at least a part of an object to be photographed based on an image photographed by the stereo camera, and information corresponding to relative positional relation between the object to be measured as measured by the calculation unit and the stereo camera or the mobile object is displayed on the display unit so that images of the information can be stereoscopically recognized. As a result, the operator can have a real feeling as if the operator operated the mobile object from a driving room or from an operation room.

Furthermore, according to the present invention, in the remote control system, the camera control unit corrects image pickup direction of the stereo camera to match the tilting of a helicopter body when the mobile object is tilted. As a result, an image can be seen, which is not disagreement with the operator's line of sight, regardless of the posture of the mobile object.

DETAILED DESCRIPTION OF THE PREFERRED EMBODIMENTS

By referring to the attached drawings, description will be given below on embodiments of the present invention.

First, description is given below on a first embodiment where the present invention is applied as a remote control system of a small flying object.

Figure 1:
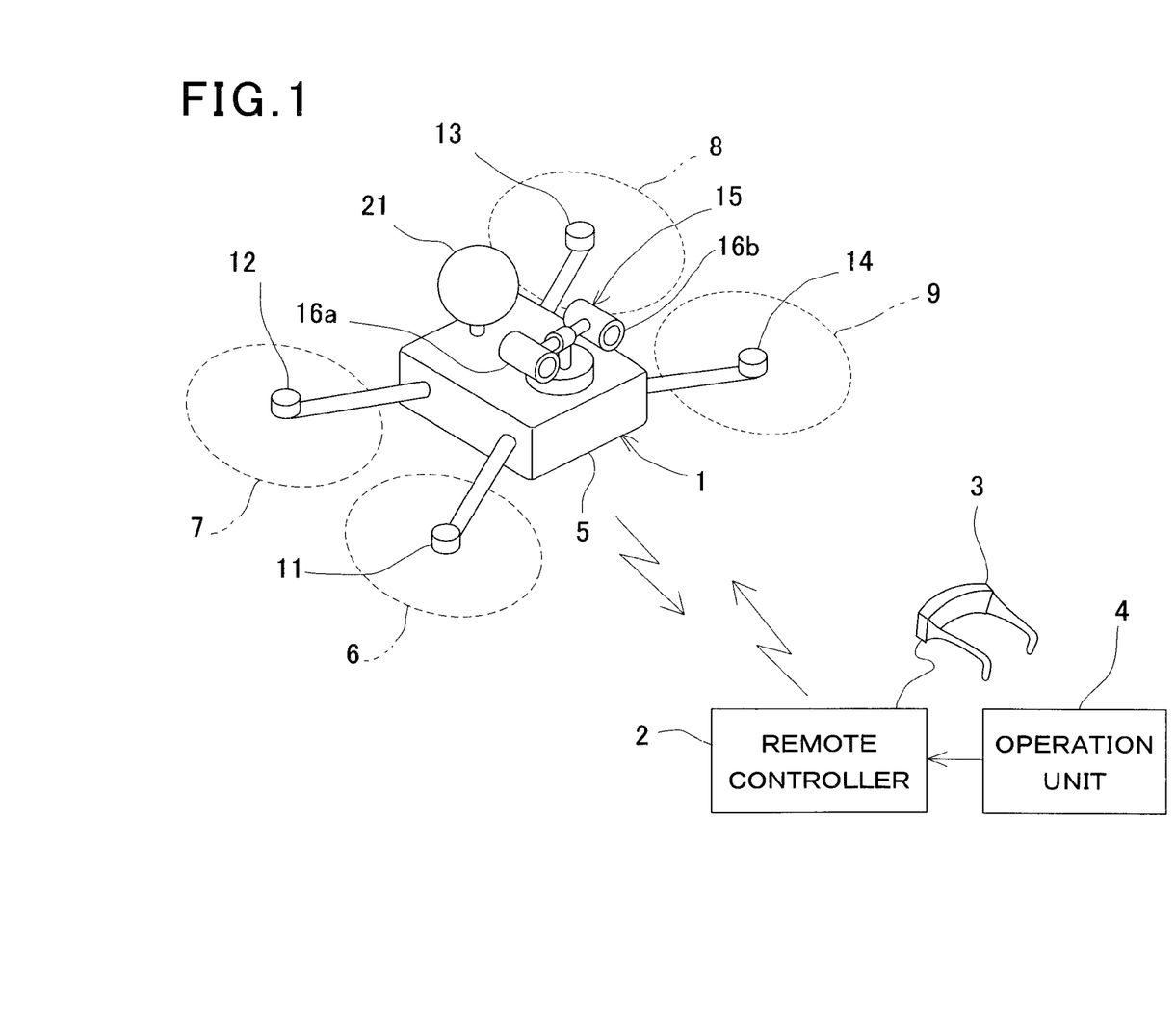
FIG. 1 is a conceptual drawing to show basic arrangement of a remote control system according to a first embodiment of the present invention.
Figure 2:
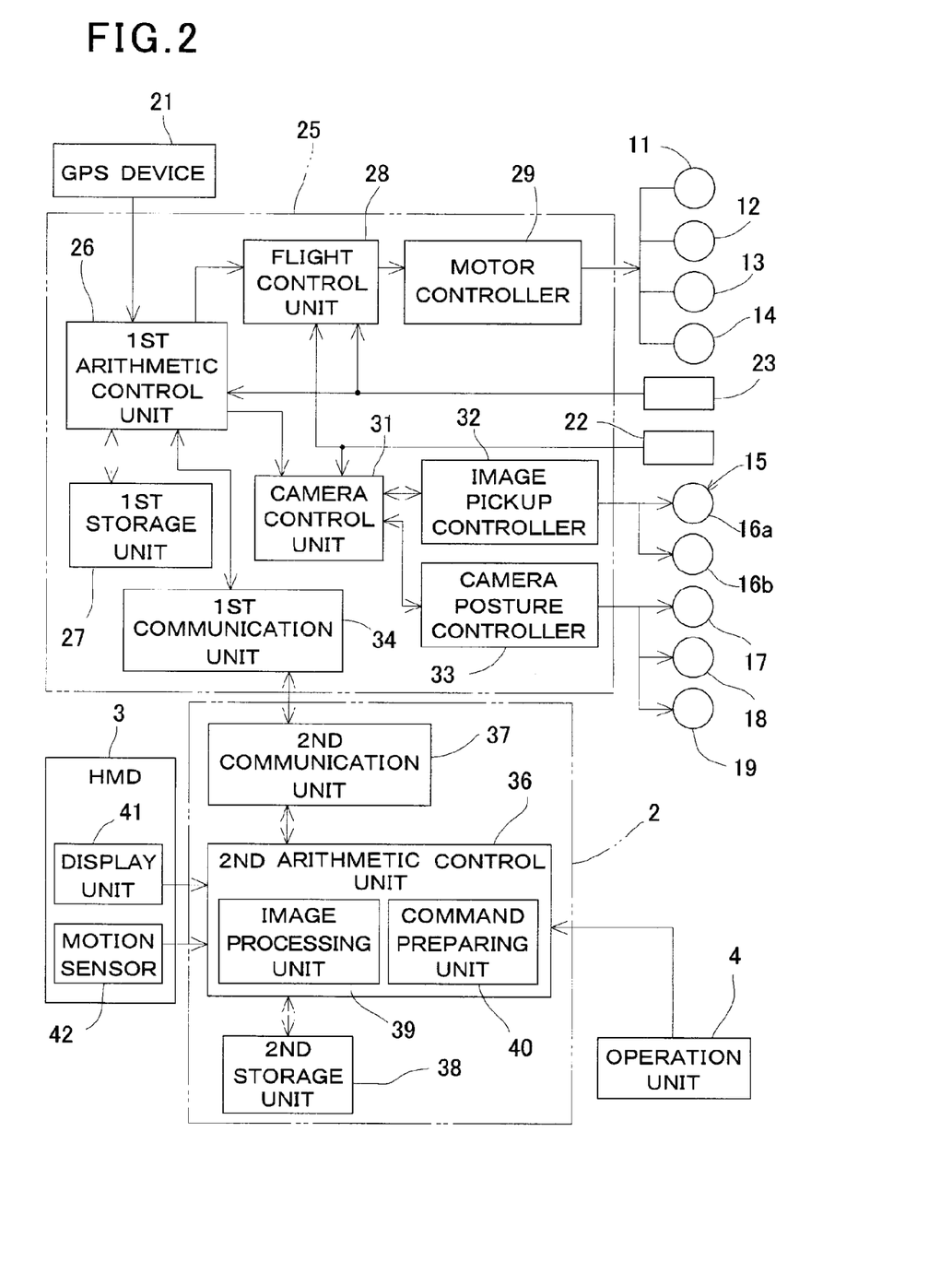
FIG. 2 is a schematical block diagram of the first embodiment.

FIG. 1 and FIG. 2 each represents a basic arrangement of a remote control system according to a first embodiment. The remote control system primarily comprises a flying object 1, an operation unit 4, which has a remote controller 2, a head-mounted display (HMD) 3, a joy stick, etc. disposed on base station side. The flying object 1 is a helicopter as a small flying object, for instance, and the helicopter 1 can be remotely controlled by the remote controller 2.

The helicopter 1 comprises a helicopter body 5 and as many propellers as required mounted on the helicopter body 5 (e.g. propellers mounted at forward, rearward, leftward and right positions respectively, i.e. four propellers 6, 7, 8 and 9), and these propellers 6, 7, 8 and 9 are connected with a first flight motor 11, a second flight motor 12, a third flight motor 13, and a fourth flight motor 14 respectively. As to be described later, driving of each of the first flight motor 11, the second flight motor 12, the third flight motor 13, and the fourth flight motor 14 are independently controlled. The propellers 6, 7, 8 and 9 as well as the first flight motor 11, the second flight motor 12, the third flight motor 13, and the fourth flight motor 14, etc. make up together a moving means of the flying object.

On an upper surface of the helicopter body 5, a stereo camera 15 is mounted. The stereo camera 15 has two digital cameras 16a and 16b disposed at left and right positions respectively, and it is so arranged that a distance between optical axes of the digital cameras 16a and 16b is set to a predetermined value—preferably, being equal to a distance between two eyes of a person, i.e. a value to match parallax of eyes of an operator.

The stereo camera 15 is rotatably supported around three axes of pitch, roll and yaw. For these axes, a pitch motor 17, a roll motor 18, and a yaw motor 19 are provided respectively so that the stereo camera 15 can be rotated along each of these axes. As each of the pitch motors 17, the roll motor 18 and the yaw motor 19 a motor, in which rotation angle can be controlled, e.g. a servo motor or a stepping motor, is used. The pitch motor 17, the roll motor 18, and the yaw motor 19 make up together a camera driving unit, which can change image pickup direction (direction of the field of view) of the stereo camera 15.

On an upper surface of the helicopter body 5, a GPS device 21 is mounted, which is a mobile object position detector to measure a position of the helicopter body 5. The GPS device 21 measures coordinates (position) in geocentric coordinate system (absolute coordinate system).

At such positions as required on the helicopter body 5, e.g. inside the helicopter body 5, a gyro unit 22, sensors 23 (e.g. azimuth sensor, altimetric sensor, speed sensor, battery residual capacity sensor) are mounted.

Inside the helicopter body 5, a control device 25 is provided. As shown in FIG. 2, the control device 25 primarily comprises a first arithmetic control unit 26, a first storage unit 27, a flight control unit 28, a motor controller 29, a camera control unit 31, an image pickup controller 32, a camera posture controller 33, a first communication unit 34, and a power supply unit (not shown). The flight control unit 28 controls driving of the first flight motor 11, the second flight motor 12, the third flight motor 13, and the fourth flight motor 14 via the motor controller 29. The camera control unit 31 controls image pickup condition of the stereo camera 15 via the image pickup controller 32 and further, controls driving of the pitch motor 17, the roll motor 18, and the yaw motor 19 via the camera posture controller 33, and also controls image pickup direction of the stereo camera 15.

By controlling the driving of the first flight motor 11, the second flight motor 12, the third flight motor 13, and the fourth flight motor 14, posture and direction of the helicopter 1 can be controlled as necessary. Therefore, the camera driving unit may not be used, and the stereo camera 15 may be fixed on the helicopter body 5 so that image pickup direction of the stereo camera 15 can be changed and controlled by the control of the first flight motor 11, the second flight motor 12, the third flight motor 13, and the fourth flight motor 14. In this case, the moving means functions as the camera driving unit.

The first communication unit 34 transmits image data as photographed by the stereo camera 15 to the remote controller 2. The first communication unit 34 receives commands relating to flying direction, flying altitude, flying speed, etc. from the remote controller 2, and also receives commands relating to photographing such as image pickup direction of the stereo camera 15 or the like.

In the first storage unit 27, various types of programs are stored. These programs include: an image processing program for carrying out signal processing of image data photographed by the stereo camera 15, a flight control program for controlling driving of the first flight motor 11, the second flight motor 12, the third flight motor 13, and the fourth flight motor 14, an image pickup control program for controlling image pickup condition of the stereo camera 15, a camera posture control program for controlling direction of the stereo camera 15 by controlling the driving of the pitch motor 17, the roll motor 18, and the yaw motor 19, and other programs. Further, in the first storage unit 27, image data photographed by the stereo camera 15 are stored. Also, various types of information such as information relating to remote control operation, e.g. information relating to advancing direction toward destination, a guidance route, etc. are stored. Information relating to remote control operation is stored in a second storage unit 38 (to be described later) of the remote controller 2.

A signal from the gyro unit 22 is inputted to the flight control unit 28. Based on the signal from the gyro unit 22, the flight control unit 28 controls the first flight motor 11, the second flight motor 12, the third flight motor 13, and the fourth flight motor 14 via the motor controller 29, and flying posture of the helicopter body 5 can be controlled. Signals from the sensors 23 are inputted to the first arithmetic control unit 26 and the flight control unit 28. As a result, flying direction, flying altitude, flying speed, etc. of the helicopter body 5 are controlled by the flight control unit 28.

To the camera control unit 31, a helicopter body posture signal is inputted from the gyro unit 22 after posture of the helicopter body 5 is detected, and based on the helicopter body posture signal, the posture of the stereo camera 15 can be maintained in a reference posture, e.g. optical axis of the stereo camera 15 can be maintained in horizontal direction. Further, it is so arranged that image pickup direction of the stereo camera 15 can be set in a predetermined direction with respect to the reference posture. That is, the camera control unit 31 corrects the image pickup direction of the stereo camera 15 based on the extent of the tilting of the helicopter body 5 when the helicopter body 5 is tilted.

The remote controller 2 comprises a second arithmetic control unit 36, a second communication unit 37, a second storage unit 38, and a power supply unit (not shown), and further, the second arithmetic control unit 36 has an image processing unit 39 and a command preparing unit 40. To the remote controller 2, the head-mounted display 3 is electrically connected by an arbitrary method such as wired or wireless connection. Further, the operation unit 4 is electrically connected.

Image data transmitted from the control device 25 are stored in the second storage unit 38, and background image data for displaying background image on the head-mounted display 3 are stored. Also, the image processing program for performing signal processing to change the image data to a video signal, a command preparing program, and other programs are stored.

Figure 3:
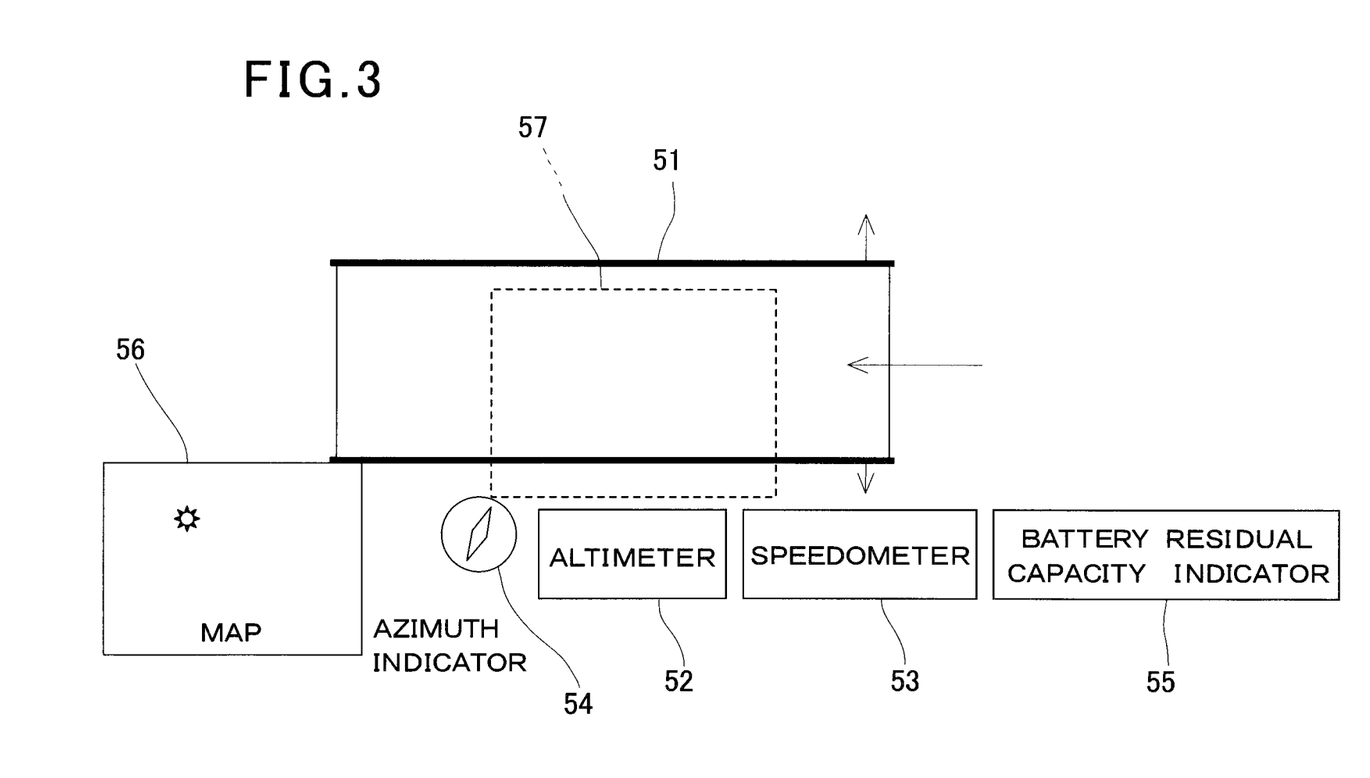
FIG. 3 is an explanatory drawing to show an example of an image to be displayed on a display unit.

As shown in FIG. 3, the background image is a CG (computer graphics) image, which has been prepared by assuming a driving room and a control room in mind. As the background image, a window 51 of the driving room and instruments below the window 51 are displayed. The background image has two images, i.e. left and right images, to match the digital cameras 16a and 16b respectively. The background images include position information relating depth, which is visually recognized when the operator identifies the images stereoscopically and the images are identified stereoscopically when the images are displayed on a 3D (three-dimensional) display 41. Further, the background images are synthesized with images photographed by the digital cameras 16a and 16b and the background images are recognized with relative depth relation with respect to the images photographed by the digital cameras 16a and 16b under the displayed condition.

As the instruments to be included in the background images are, for instance, an altimeter 52, a speedometer 53, an azimuth indicator 54 (to display direction of the flying object 1), a battery residual capacity indicator 55, a position (ground surface coordinate value) indicator 56, etc. A front surface of the helicopter body 5 is displayed on the window 51. For instance, a window frame is indicated at the center of the window 51, or a mark such as arrow mark is displayed. The azimuth indicator 54 has an indicator needle to display direction such as east, west, south, or north, and to show direction of the helicopter 1. The position indicator 56 indicates a map of an area, over which the flying object flies, and indicates a position of the helicopter 1 measured by the GPS device 21 on this map. The helicopter 1 is indicated by a light spot or by a mark such as open circle or the like, and the helicopter 1 is shown by a graphic form to represent the helicopter 1.

The control device 25 transmits image data via the first communication unit 34. The remote controller 2 receives the image data via the second communication unit 37. The image data are inputted to the second storage unit 38 via the second arithmetic control unit 36 and are temporarily stored in the second storage unit 38. The image data thus stored are processed by signal processing to change to video signals at the image processing unit 39 and are sent to the head-mounted display 3. The image processing unit 39 sends the background image data as video signals to the head-mounted display 3 and processes the video signals so that the image data and the background data are synthesized and displayed.

The command preparing unit 40 prepares a camera control command of the stereo camera 15 based on a signal from a motion sensor 42 (to be described later). Then, based on a signal from the operation unit 4, a flight control command is prepared. The camera control command and the flight control command are transmitted to the control device 25 by the second communication unit 37.

The head-mounted display 3 has the 3D display 41, which is a display unit to display three-dimensional image, and a motion sensor 42, which serves as a posture detecting unit for detecting movement and direction of the head-mounted display 3, and the head-mounted display 3 is put on by an operator just as the eyeglasses are put on.

The 3D display 41 has display units at left and right respectively to correspond to both eyes of the operator. On the display units, images having parallax as photographed by the digital cameras 16a and 16b are displayed respectively and the operator can recognize the images displayed on the display units at left and right as the three-dimensional image by individually watching by left eye and right eye respectively. Also, the images photographed by the stereo camera 15 are synthesized with the background images and displayed on the 3D display 41, and the images photographed by the stereo camera 15 are displayed as if these images are photographed through the window 51.

The motion sensor 42 detects motion and direction of the head-mounted display 3, i.e. movement and direction of head (or face) of the operator, and outputs a motion signal, and the motion signal is inputted to the command preparing unit 40 of the second arithmetic control unit 36.

The command preparing unit 40 prepares a camera control command based on the motion signal. The camera control command is designed as a command to control posture of the stereo camera 15 so that the camera control command is synchronized with motion and direction of the face of the operator and that an operator's line of sight coincides with optical axis of the stereo camera 15.

The operation unit 4 has an operation member such as a joy stick or the like. It is arranged in such a manner that, by operating the operation member, the operation unit 4 is able to output the signals relating to the flight, i.e. signals relating to flying direction, flying speed, flying altitude, etc. according to the movement of the operation member. The signals relating to the flight are inputted to the command preparing unit 40. At the command preparing unit 40, a flight control command to control the first flight motor 11, the second flight motor 12, the third flight motor 13, and the fourth flight motor 14 is prepared based on the signals relating to the flight, and the flight control command is transmitted to the control device 25 by the second communication unit 37.

Figure 4:
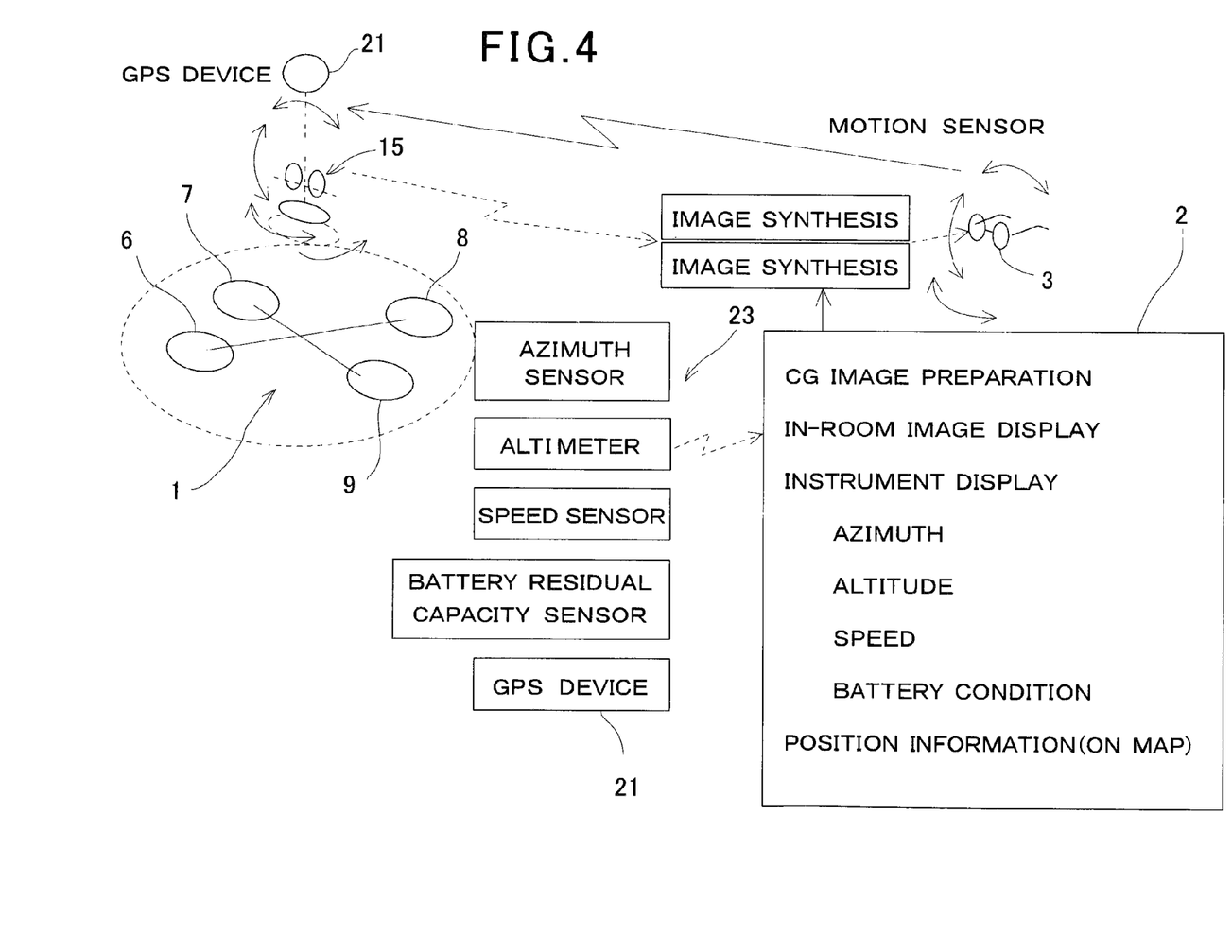
FIG. 4 is a schematical illustration to show flows of image data between a helicopter and a remote controller.

Now, referring to FIG. 4, description will be given on operation of the first embodiment. FIG. 4 shows a flow of signals relating to images.

The operation unit 4 of the remote controller 2 is operated, and the flight of the helicopter 1 is started.

Based on the signals from the operation unit 4, a flight control command is prepared at the command preparing unit 40, and the flight control command is received by the control device 25 via the second communication unit 37 and the first communication unit 34. Then, the first arithmetic control unit 26 controls the first flight motor 11, the second flight motor 12, the third flight motor 13, and the fourth flight motor 14 so that the helicopter 1 is operated in the flying direction, at the flying speed, and at the flying altitude, etc. via the flight control unit 28 and the motor controller 29 based on the flight control command.

The flying condition of the helicopter 1 is detected by the sensors 23. Signals from the sensors 23 are transmitted from the first communication unit 34 and are received by the remote controller 2 via the second communication unit 37.

The results of detection by the sensors 23 as received at the second communication unit 37 are stored at the second storage unit 38, and these results are displayed on the altimeter 52, the speedometer 53, the azimuth indicator 54, the battery residual capacity indicator 55, and the position indicator 56 when the operator's line of sight is directed toward the instruments in the background images as to be described later.

During the flight, the images photographed by the stereo camera 15 are transmitted to the remote controller 2 via the first communication unit 34. Then, these images are received by the second communication unit 37 of the remote controller 2, and signal processing is performed as images of a displaying field of view 57 at the image processing unit 39.

The image processing unit 39 synthesizes the background image and the displaying field of view 57. Further, the results of detection by the sensors 23 are converted to images, and these images are synthesized and displayed on the altimeter 52, the speedometer 53, the azimuth indicator 54, the battery residual capacity indicator 55, and the position indicator 56.

The image processing unit 39 displays these images so that parallax is caused on the display units at left and right of the 3D display 41, and that these images can be visually recognized as three-dimensional images.

Based on the three-dimensional images displayed on the 3D display 41, the operator operates the helicopter 1. The range where the three-dimensional images are displayed coincides with field of view (field angle) of the stereo camera 15, and the range is a rectangular portion (the displaying field of view 57) as shown by broken line in FIG. 3. The background image is prepared so as to have a field angle sufficiently larger than the displaying field of view 57. For instance, the background image has a range where the line of sight can be moved during driving, and the size of the window 51 has such field of view (extent), which is large enough to obtain information in forward direction necessary for driving.

The center (optical axis) of the background image coincides with direction of the forward direction of the helicopter 1, and the center (optical axis) of the displaying field of view 57 coincides with the forward direction of the face of the operator. Therefore, when the operator moves face (head) without changing posture and direction of the helicopter 1, the movement of the face of the operator is detected by the motion sensor 42. Signals of the motion sensor 42 are converted to a command of posture control of the stereo camera 15 by the command preparing unit 40, and the command is transmitted to the control device 25. Based on the command received via the first communication unit 34, the camera control unit 31 controls the posture of the stereo camera 15. Therefore, following after the movement of the face of the operator, the displaying field of view 57 moves within the range of the background image. To facilitate the explanation, the entire background image is shown in FIG. 3, while the range which is displayed on the 3D display 41 is only the displaying field of view 57.

When the helicopter body 5 is tilted, deviation occurs between the operator's line of sight issued by the motion sensor 42 and the image pickup direction of the stereo camera 15. As described above, the camera control unit 31 corrects deviation of the stereo camera 15 from the reference position by a signal from the gyro unit 22. The tilting of the helicopter body 5 is corrected with respect to the signal from the motion sensor 42, and the posture of the stereo camera 15 is controlled.

If the posture and the direction of the helicopter 1 are changed without moving the face (head) of the operator, there is no relative displacement between the displaying field of view 57 and the background image. That is, the position of the displaying field of view 57 is fixed with respect to the background image, and the image photographed by the stereo camera 15 is moved with respect to the background image. In this case, too, the camera control unit 31 controls the posture of the stereo camera 15 so that the tilting will be corrected when the helicopter body 5 is tilted.

Therefore, when the head of the operator is directed downward, the displaying field of view 57 is moved in downward direction with respect to the background image, and the altimeter 52, the speedometer 53, the azimuth indicator 54, the battery residual capacity indicator 55, and position indicator 56 appear in the displaying field of view 57. On the altimeter 52, the speedometer 53, the azimuth indicator 54, the battery residual capacity indicator 55, and the position indicator 56, the position measured by the GPS device 21 is displayed and the results detected by the sensors 23 are displayed. The flying conditions of the helicopter 1 can be confirmed from the indication on the instruments while operating the helicopter, and the results can be immediately reflected in the operation.

On the 3D display 41, information relating to the remote control operation as stored in the first storage unit 27, i.e. a direction, in which the helicopter should be directed, and flying route are displayed. The information relating to the remote control operation may be displayed at all times, or may be displayed adequately by operation of the operation unit 4 by the operator.

Therefore, the operator can have such feeling as real as if the operator operated the helicopter 1 in the operation room. Further, flying condition of the helicopter 1 can be correctly identified, and operation based on intuitive feeling can be carried out, or adequate action can be taken to cope with the problem caused by obstacle or hindrance.

Also, because two images can be obtained at the same time by the digital cameras 16a and 16b, which are in known relation to each other, photogrammetry, i.e. distance measurement in forward direction, can be performed from the two images obtained. Also, positions separated by a certain distance from the helicopter 1 can be set up on the image.

If safe flight interval is set in such a manner that safe flight against an obstacle and if the safe flight interval is displayed on the 3D display 41 so that virtual line or virtual wall can be identified stereoscopically, the operator can make the helicopter fly so as not to close the obstacles beyond the safe flight interval when the helicopter is flown in the space with obstacles. In a case where an obstacle is found in flying direction, photographic measurement is performed by considering the obstacle as an object to be measured at the first arithmetic control unit 26 or at the second arithmetic control unit 36. It may be arranged in such a manner that a distance between the obstacle and the helicopter 1 is measured at real time, and that an alarm is issued or display is flashed if the result of measurement is narrower than the safe flight interval.

Figure 5:
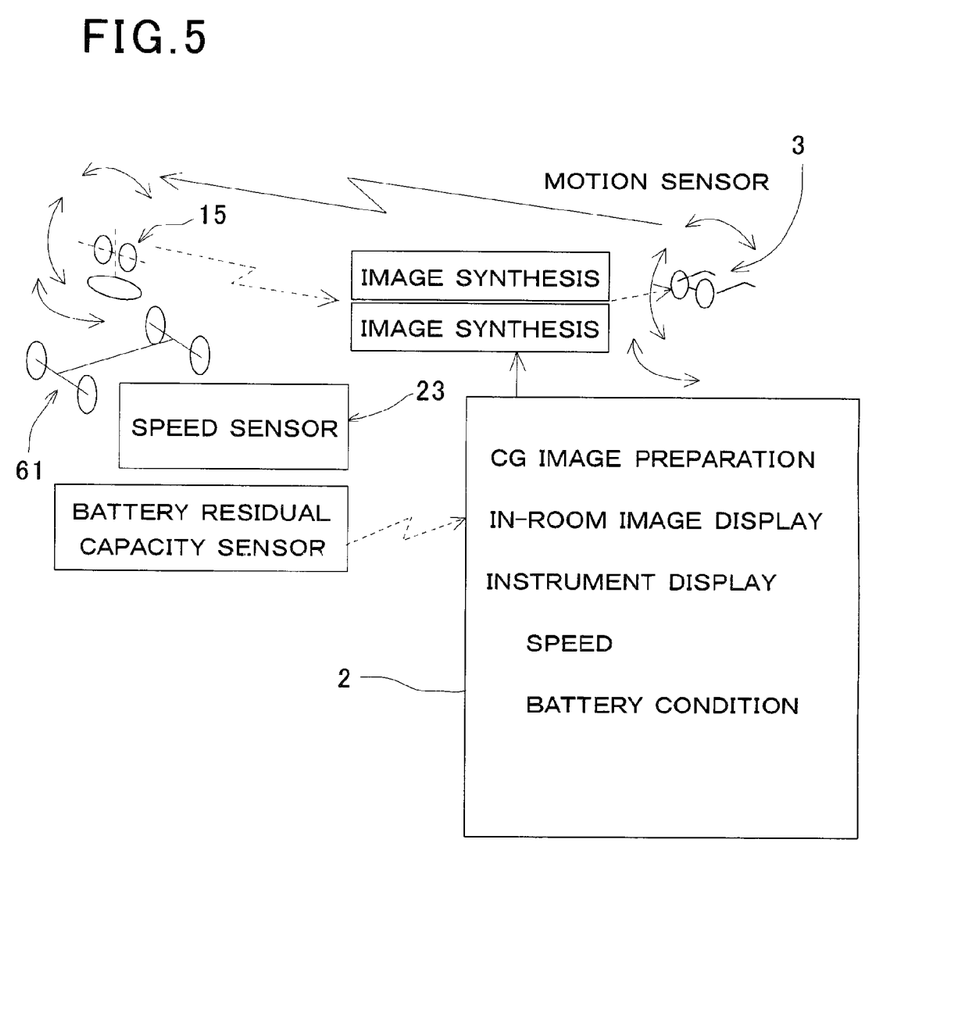
FIG. 5 is a schematical illustration to show flows of image data between a remotely controlled vehicle and a remote controller in a case where the mobile object is a remotely controlled vehicle.

Next, referring to FIG. 5, description will be given on a second embodiment. In FIG. 5, the same component shown in FIG. 4 is referred by the same symbol.

In the second embodiment, the object of the remote control operation is a small type running vehicle, e.g. a remotely controlled vehicle 61.

In the second embodiment, too, a stereo camera 15 is installed on a required position such as on a ceiling, for instance. The stereo camera 15 has two digital cameras 16a and 16b. The stereo camera 15 is rotatably supported on three axes, i.e. pitch axis, roll axis and yaw axis, and the stereo camera 15 can be controlled by rotating around each of these axes.

In case of the remotely controlled vehicle 61, moving means to drive the remotely controlled vehicle 61 are running motor wheels and a running motor to rotate the wheels. The means for controlling the running is the control of rotating speed (running speed) of the wheels and handle operation (in running direction). As a sensor to detect the running condition of the remotely controlled vehicle 61, a speed sensor and a battery residual capacity sensor to detect consumed condition of the battery are installed.

A remote control operator uses a head-mounted display 3 disposed on operator's head. The head-mounted display 3 is provided with a motion sensor, and is so controlled that direction of the stereo camera 15 coincides with direction of a remote control operator's line of sight by following after the motion of the motion sensor and the motion of the head of the remote control operator.

On the head-mounted display 3, images photographed by the stereo camera 15 are displayed, and background images to simulate the driving room are synthesized and displayed. On the background images, a speedometer is displayed to match a scene of the driving room, and the control operator can carry out remote control operation while watching and visually recognizing the running direction or three-dimensional images in and around the running direction from the driving room of the remotely controlled vehicle 61 and can concurrently perform speed adjustment while watching and visually recognizing the speedometer in the driving room. Therefore, the operator can have such feeling as real as if the operator were in the remotely controlled vehicle 61. Further, the operator can operate by intuitive judgment.

In the embodiment as described above, the images are displayed on the head-mounted display 3, while it may be so arranged that the images are displayed on a normal type display, which can give three-dimensional display, and that the operator may have three-dimensional glasses on so that three-dimensional images can be seen. In this case, the motion sensor alone is set on the head of the operator and the direction of the operator's line of sight is detected.

In the embodiment as described above, one set of the stereo camera 15 is installed on the mobile object, while it may so arranged that two or more sets of the stereo cameras 15 are installed and as many operators as to match the stereo cameras 15 wear the head-mounted display 3 respectively, and that each of the operators may perform individual operation based on the three-dimensional images obtained by the stereo cameras 15 respectively. For instance, one operator devotes himself in the operation of the mobile object, and another operator devotes himself in observation of actual condition or in photographing operation or in surveying operation, etc.

The invention claimed is:

1. A remote control system, comprising a mobile object, a remote controller for remotely controlling the mobile object, and a storage unit where background images to simulate a driving room or an operation room of the mobile object are stored, wherein said mobile object has a stereo camera which acquires an image of a displaying field of view smaller than a field angle of said background image, a camera control unit for controlling image pickup direction of said stereo camera, and a first communication unit for performing communication of information including at least images photographed by said stereo camera, wherein said remote controller has a second communication unit for performing communication to and from said first communication unit, a display unit, and a control unit for controlling said mobile object, wherein said control unit synthesizes at least a part of the images of said displaying field of view and said background images and for displaying the images on said display unit so that a stereoscopic view can be displayed, and displays the image of said displaying field of view relatively movable within a range of said background image.

2. A remote control system according to claim 1, comprising a posture detecting unit for detecting direction of an operator's line of sight, said camera control unit can change image pickup direction of said stereo camera based on result of detection by said posture detecting unit, and wherein said control unit moves said displaying field of view relative to said background image based on a detection result of said posture detecting unit.

3. A remote control system according to claim 1 or 2, wherein said mobile object has camera driving units for changing image pickup direction of said stereo camera with respect to said mobile object, and image pickup direction can be changed by controlling said camera driving unit based on result of detection by the posture detecting unit.

4. A remote control system according to claim 1 or 2, wherein said mobile object has a moving means for moving said mobile object, and said moving means can change image pickup direction of said stereo camera by controlling posture of said mobile object based on result of detection by said posture detecting unit.

5. A remote control system according to claim 1 or 2, wherein said display unit is a head-mounted display, and said posture detecting unit is mounted on said head-mounted display.

6. A remote control system according to claim 1 or 2, wherein said background images stored in said storage unit include position information relating to depth of a scene as visually recognized at the time of stereoscopic identification by the operator, and images can be visually recognized with relative depth with respect to the images photographed by said stereo camera when said background images are displayed on said display unit.

7. A remote control system according to claim 1 or 2, wherein said mobile object has a mobile object position detecting unit for acquiring position information of said mobile object, information relating to the remote control operation is stored in said storage unit, and information relating to said remote control operation is displayed on said display unit based on an output of said mobile object position detecting unit.

8. A remote control system according to claim 1 or 2, comprising a calculation unit for carrying out stereoscopic measurement on at least a part of an object to be photographed based on an image photographed by said stereo camera, and information corresponding to relative positional relation between the object to be measured as measured by said calculation unit and said stereo camera or said mobile object is displayed on said display unit so that images of said information can be stereoscopically recognized.

9. A remote control system according to claim 1 or 2, wherein said camera control unit corrects image pickup direction of said stereo camera to match the tilting of a helicopter body when the mobile object is tilted.

10. A remote control system according to claim 1 or 2, wherein a window of a driving room or a control room is displayed on said background image and the image of said displaying field of view is displayed as an image photographed through said window.

11. A remote control system according to claim 1 or 2, wherein images of instruments are included in said background image and by moving a direction of an operator's line of sight, said images of instruments are displayed in said background image.

* * * * *